United States Patent [19]

Kamitani et al.

[11] Patent Number: 5,099,112
[45] Date of Patent: Mar. 24, 1992

[54] DETECTOR POSITION ADJUSTING MECHANISM FOR RANGEFINDER AUTOMATIC FOCUSING SYSTEM

[75] Inventors: Masatoshi Kamitani; Motohiro Nakanishi; Tetsuya Mizuguchi, all of Osaka, Japan

[73] Assignee: Minolta Camera Kabushiki Kaisha, Osaka, Japan

[21] Appl. No.: 602,052

[22] Filed: Oct. 24, 1990

Related U.S. Application Data

[63] Continuation of Ser. No. 351,780, May 15, 1989, abandoned.

[30] Foreign Application Priority Data

May 16, 1988 [JP] Japan .................. 63-118672
May 16, 1988 [JP] Japan .................. 63-118673

[51] Int. Cl.⁵ .................. G01J 1/20; G03B 3/00
[52] U.S. Cl. .................. 250/201.6; 354/403
[58] Field of Search .......... 250/201, 239, 201.4, 250/201.6; 356/1, 4; 354/403

[56] References Cited

U.S. PATENT DOCUMENTS

| | | | |
|---|---|---|---|
| 4,278,340 | 7/1981 | Toyama et al. | 354/403 |
| 4,350,418 | 9/1982 | Taguchi et al. | 354/403 |
| 4,412,129 | 10/1983 | Duncan | 250/239 |
| 4,453,812 | 6/1984 | Suzuki et al. | 354/403 |
| 4,643,555 | 2/1987 | Wakabayashi | 354/403 |
| 4,682,886 | 7/1987 | Toyama et al. | 354/403 |
| 4,696,559 | 9/1987 | Kondo | 354/403 |
| 4,828,383 | 5/1989 | Kunishige et al. | 354/403 |

FOREIGN PATENT DOCUMENTS

| | | |
|---|---|---|
| 54-61522 | 5/1979 | Japan . |
| 54-111858 | 9/1979 | Japan . |
| 57-46764 | 10/1982 | Japan . |
| 60-120414 | 8/1985 | Japan . |
| 60-186708 | 9/1985 | Japan . |

Primary Examiner—David C. Nelms
Assistant Examiner—Michael Messinger
Attorney, Agent, or Firm—Willian Brinks Olds Hofer Gilson & Lione

[57] ABSTRACT

A detector position adjusting mechanism for a rangefinder in an automatic focusing system having a light emitting element, a photodetector and a detecting circuit is disclosed. In the adjusting mechanism, a first biasing member biases the light emitting element in one direction parallel to the optical axis of the light emitting element so as to urge the light emitting element towards a reference surface of a holding body for holding the light emitting element, and a second biasing member biases the light emitting element toward the holding body in a direction parallel to the base line. Furthermore, an adjustment member is engaged in a cam surface of the light emitting element so as to reposition the light emitting element in the direction parallel to the base line.

26 Claims, 7 Drawing Sheets

DETECTOR POSITION ADJUSTING MECHANISM FOR RANGEFINDER AUTOMATIC FOCUSING SYSTEM

This application is a continuation of application Ser. No. 351,780, filed May 15, 1989.

BACKGROUND OF THE INVENTION

1. Field of the Invention

The present invention generally relates to a photographic rangefinder utilizing the principle of triangulation, and more particularly, to a position adjusting mechanism for a detector used in the rangefinder for automatic focusing purpose.

2. Description of the Related Art

Figure 1:
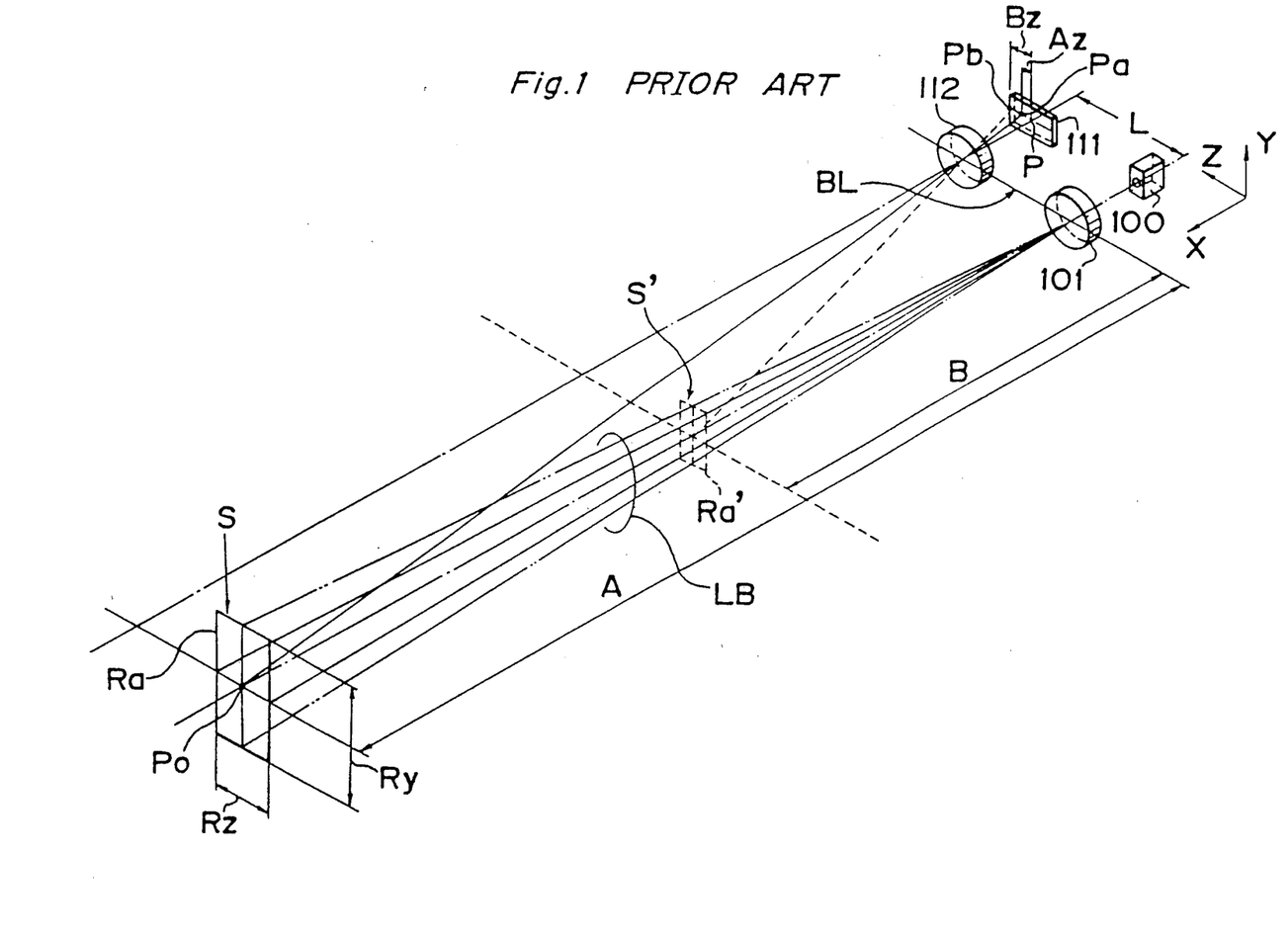
FIG. 1 is a schematic perspective view showing the principle for triangulation in distance measurement.

FIG. 1 shows the principle of distance measurement based on triangulation used in a rangefinding system in, for example, a photographic camera.

Referring to FIG. 1, a beam of light LB emitted from a light emitting device 100 such as an LED is projected through a light projecting (condenser) lens 101 onto an area Ra of a subject S at a predetermined distance A or B from the lens 101, wherein the area Ra of the subject S has a width Rz and a height Ry, and Po represents the center of the area Ra. A beam of light LB so projected is reflected irregularly by the area Ra of the subject S, and the reflected light passes through a light receiving lens 112 onto a photodetector 111 such as a phototransistor so as to form an image of the subject S thereon.

In FIG. 1, Pa denotes an incident position of the reflected light from the subject S on the photodetector 111, and P denotes the center of the photodetector 111. The deviation amount Az of the reflected light corresponding to the distance between the light detecting position Pa on the photodetector 111 and the center position P of the photodetector 111 is expressed by the following equation:

$$Az = L \cdot \frac{f}{A} \quad (1)$$

wherein L is the base length (the length of a base line BL) between the light projecting lens 101 and the light receiving lens 112, which corresponds to the distance between the centers of the light projecting lens 101 and the light receiving lens 112, f is the focal length of the light receiving lens 112, and A is the distance between the light projecting lens 101 and the subject S.

As shown in FIG. 1, the direction of the optical axis of a beam of light LB emitted from the light emitting device 100 through the light projecting lens 101 is referred to as an X- axis direction, a vertical direction thereof is referred to as a Y- axis direction, and a horizontal direction thereof which is orthogonal to the X- and Y- axis directions and is parallel to the base line BL is referred to as a Z- axis direction. In the triangulation type rangefinder constructed as described above, the following three conditions must be satisfied in order to determine the distance to the subject S precisely.

(1) Condition 1: A beam of light LB emitted from the light emitting device 100 through the light projecting lens 101 agrees with a beam of light passing through the center of the light receiving lens 112 and incident on the light detecting position Pa on the photodetector 111, at the center Po of the area Ra in the Z- axis direction under the condition wherein the distance from the system to the subject S is given A.

(2) Condition 2: The predetermined position on the photodetector 111 agrees with the center of the light receiving lens 112 in the Y- axis direction, and the center of the light emitting device 100 agrees with the center of the light projecting lens 101 in the Y- axis direction.

(3) Condition 3: The size of the image of the light emitting device 100 formed on the subject S is appropriate, and the image thereof is in focus in the X-axis direction under the condition of the predetermined distance A.

If the aforementioned condition 1 is not satisfied, as is apparent from the equation (1), obtained information is erroneously shifted from a proper value, and the accurate distance measurement is impossible.

If the aforementioned condition 2 is not satisfied, the image of the subject S to be subsequently formed on the photodetector 111 will not be formed on a light receiving surface of the photodetector 111, resulting in that the light amount incident onto the photodetector 111 may decrease, and the signal to noise ratio of the output of the photodetector 111 may decrease. In this case, a wrong distance may be determined.

If the aforementioned condition 3 is not satisfied, the image of the light emitting device 100 formed on the surface of the photodetector 111 may be too large, and a problem similar to that of the condition 2 may occur. Furthermore, if the image of the light emitting device 100 formed on the photodetector 111 is out of focus, the luminance distribution of the image thereof varies, resulting in that the deviation amount Az shown in FIG. 1 varies according to the distance to the subject S. In this case, a wrong distance may be determined.

In order to satisfy the aforementioned three conditions, there is provided a position adjusting mechanism for adjusting the light emitting device 100 in the X-, Y- and Z- axis directions so as to adjust the position thereof into the predetermined position. One example of the adjusting mechanism will be described below with reference to FIGS. 2 to 4.

Figure 2:
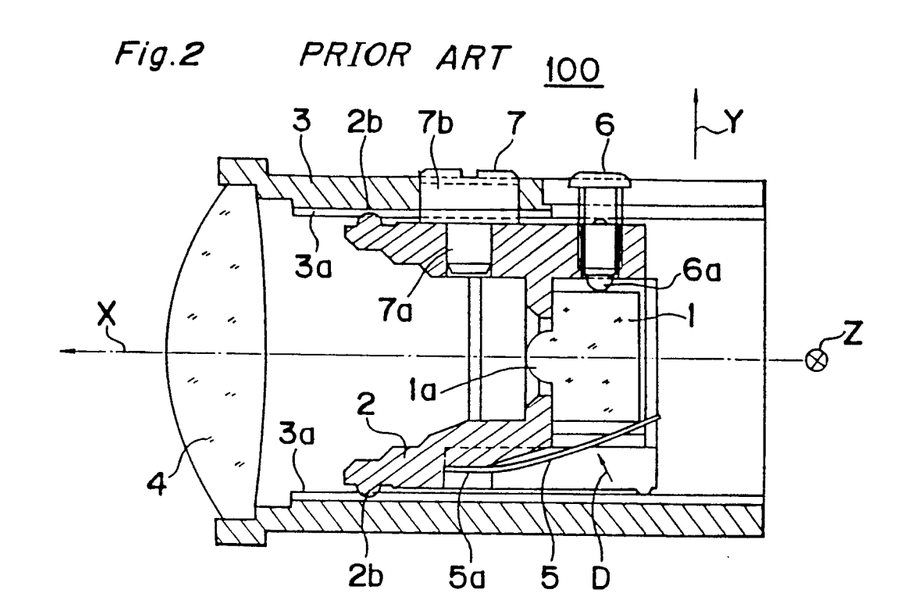
FIG. 2 is a longitudinal sectional view showing a light emitting device used in the conventional rangefinder.
Figure 3:
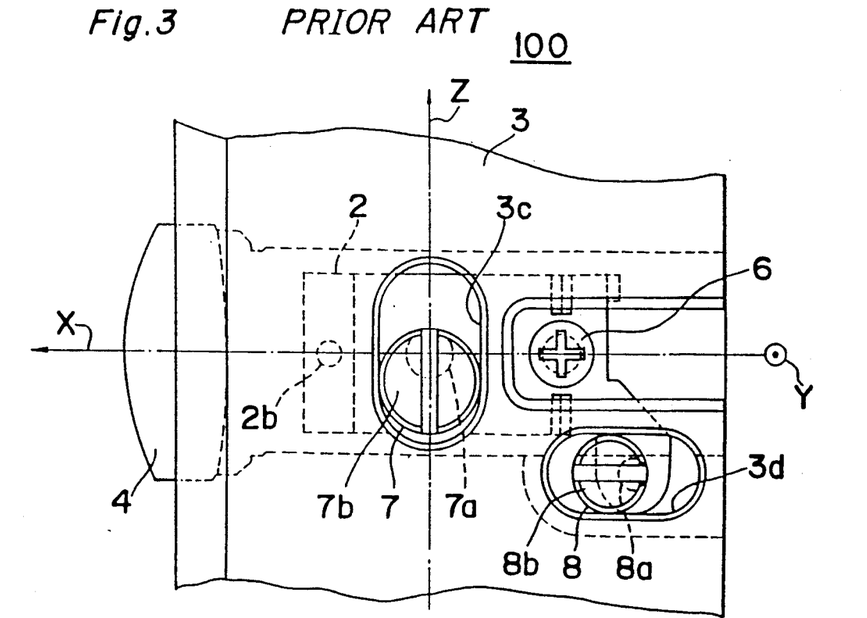
FIG. 3 is a top plan view showing the light emitting device shown in FIG. 2.

FIG. 2 shows a longitudinal section of the light emitting device 100, and FIG. 3 is a top plan view thereof.

As shown in FIG. 2, the light emitting device is in the form of a single projection module including a light projecting lens 1a facing towards the subject or scene and a light emitting element 1 arranged behind the lens 1a so as to emit rays of light towards the lens 1a. The light emitting element 1 is mounted on a holder 2, and is adjustably biased in one direction, indicated by an arrow D shown in FIG. 2, by a plate spring 5 having one end portion 5a fixed to the holder 2. Furthermore, an adjustment screw 6 is screwed into the holder 2 in a direction counter to the direction in which the light emitting element 1 is normally biased by the plate spring 5, i.e., counter to the direction D so that a hemispherical end portion 6a of the adjustment screw 6 can be held in contact with a peripheral face of the light emitting element 1. The adjustment screw 6 presses the light emitting element 1 downward, as viewed in FIG. 2, against the biasing force of the plate spring 5. Furthermore, the position of the light emitting element 1 is regulated in the Z- axis direction by the holder 2. Accordingly, when the adjustment screw 6 is rotated, the position of the light emitting element 1 can be adjusted in the Y- axis direction by/against the plate spring 5.

The holder 2 is housed in a body 3 of the rangefinder. A pair of guiding grooves 3a which are parallel to the X- axis direction are formed on the top and bottom portions of the inner surface of the body 3 of the rangefinder. On the other hand, a pair of hemispherical projections 2b are formed on the top and bottom portions of the outer surface of the holder 2, and the hemispherical projections 2b are engaged in the guiding grooves 3a, respectively. Thus, the hemispherical projections 2b of the holder 2 can be slidably moved along the guiding grooves 3a, i.e., the X- axis direction. Furthermore, a leg portion 7a of a first eccentric shaft 7 is inserted rotatably into the holder 2, and a head portion 7b thereof is engaged slidably in a generally elliptical groove 3c formed in the top portion of the body 3 of the rangefinder. The elliptical groove 3c is so formed that the major axis (longitudinal direction) thereof extends orthogonal to the guiding groove 3a, and parallel to the Z- axis direction. Furthermore, a leg portion 8a of a second eccentric shaft 8 is inserted rotatably into the holder 2. A head portion 8b of the second eccentric shaft 8 is engaged slidably in a generally elliptical groove 3d formed in the top portion of the body 3 of the rangefinder. The elliptical groove 3d is so formed that the major axis (longitudinal direction) thereof extends generally parallel to the guiding groove 3a. Furthermore, a light projecting lens 4 is mounted on a front end portion of the body 3 of the rangefinder. It is to be noted that, within the body 3 of the rangefinder, a photodetector and a light receiving lens for converging the reflected light from the subject onto the photodetector are mounted is a known manner, however, the details thereof are omitted herein.

Next, the manner, in which the position of the light emitting element 1 in the rangefinder is adjusted, will be described hereinafter.

First of all, when the first eccentric shaft 7 is rotated in order to satisfy the aforementioned condition 3, i.e., to make the size of the image of the light emitting element formed on the photodetector appropriate, the leg portion 7a thereof is displaced relative to the head portion 7b thereof, with the head portion 7b causing the holder 2 to displace in the X- axis direction while the hemispherical projection 2b is guided along the guiding groove 3a and the second eccentric shaft 8 is guided along the elliptical groove 3d. The light emitting element 1 is therefore displaced relative to the light projecting lens 4 incident to this displacement of the holder 2, resulting in that the width of a beam of light projected by the light emitting element 1 can be adjusted.

Next, in order to satisfy the aforementioned condition 2, the adjustment screw 6 is rotated. By this rotation of the adjustment screw 6, the hemispherical end portion 6a of the adjustment screw 6 is displaced either upwards or downwards as viewed in FIG. 2, along the Y- axis direction relative to the holder 2, depending on the direction of turn of the screw 6. When the hemispherical end portion 6a thereof is moved upward, the light emitting element 1 is moved by the biasing force of the plate spring 5. On the other hand, when the hemispherical end portion 6a thereof is moved downward, the light emitting element 1 is moved downward against the biasing force of the plate spring 5. Thus, the light emitting element 1 is moved either upwards or downwards, and is displaced relative to the optical axis of the light projecting lens 4. Thus, a beam of light projected from the light emitting element 1 can be adjusted by the above relative displacement between the light projecting lens 4 and the light emitting element 1, and therefore, the light emitting element 1 can be brought in alignment with the optical axis of the photodetector in the Y- axis direction.

Finally, in order to satisfy the aforementioned condition 1, the second eccentric shaft 8 is rotated. Then, the leg portion 8a of the second eccentric shaft 8 is displaced relative to the head portion 8b thereof, the holder 2 connected to the leg portion 8a is rotated around the hemispherical projection 2b. According to the rotation of the holder 2, the projecting direction of the light emitting element 1 is moved in the Z- axis direction. By this movement of the light emitting element 1 in a direction parallel to the direction of the base length, a line linking the position Pa specified on the photodetector 111 with the center of the light receiving lens 112 can be brought into alignment with the optical axis of the light emitting element 1 at the center Po of the subject S at a predetermined distance A from the light projecting lens 101.

Figure 4:
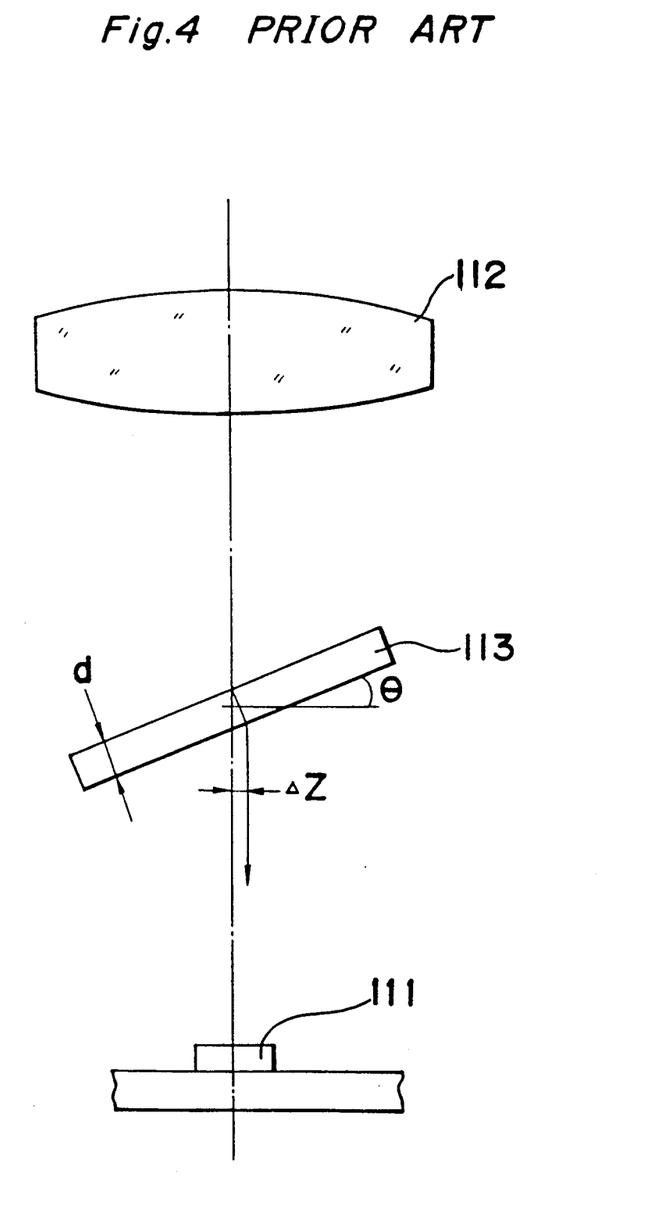
FIG. 4 is a schematic plane view showing the conventional fine adjustment mechanism for the adjustment of the light emitting device in a Z- axis direction.

Another fine adjustment mechanism shown in FIG. 4 is provided for performing the highly precise adjustment in the Z- axis direction, so that the line linking the position Pa on the photodetector 111 with the center of the light receiving lens 112 can agree with the optical axis of the light emitting element 1 at the center Po of the subject S. In the fine adjustment mechanism, this adjustment can be performed by rotating an adjustment plate lens or glass 113 for adjusting the base length (the length L of the base line BL), which is supported for rotation about the Y- axis direction and is disposed generally intermediate between the light receiving lens 112 and the photodetector 111. Then, the relationship between the rotation angle $\theta$ of the adjustment plate glass 113 and the amount $\Delta z$ of movement of the image of the light emitting device formed on the photodetector 111 is expressed by the following equation (2):

$$\Delta z = d \cdot \sin\theta \left( 1 - \cos\theta \cdot \sqrt{\frac{1}{n^2 - \sin^2\theta}} \right) \quad (2)$$

wherein d is a thickness of the adjustment plate glass 113, and n is a refractive index of the adjustment plate glass 113.

Under the condition of d=0.8 mm, n=1.4836, and $\theta=1°$, a resolution $\Delta z$ of 4.6 $\mu$m is obtained.

In the conventional rangefinder described above, since the fine adjustment mechanism for the fine adjustment in the Z- axis direction is used in addition to the respective adjustment mechanisms for the adjustment in the X-, Y- and Z- axis directions, there are such disadvantages that it takes a long time to adjust the position of the light emitting element 1, and it is costly because it is comprised of a number of parts, etc..

In a compact camera, it is necessary to decrease the base length L and the focal length f of the light receiving lens 112 in the aforementioned equation (1) in order to make the camera compact. However, when the base length L and the focal length f are decreased for a given distance A, the deviation amount Az of the image formed on the photodetector 111 decreases, and therefore, it is necessary to highly precisely adjust respective parts of the rangefinder in order to satisfy all of the aforementioned three conditions.

SUMMARY OF THE INVENTION

An essential object of the present invention is to provide a position adjusting mechanism for a rangefinder for an automatic focusing system which is able to adjust the position of a light emitting element in a relatively short time which employing a minimized numbers of component parts.

Another object of the present invention is to provide a rangefinder for an automatic focusing system which is able to adjust the light emitting element highly precisely with a simple structure.

A further object of the present invention is to provide an apparatus for adjusting the position of the light emitting element which is able to adjust the light emitting element highly precisely with a simple structure.

According to one aspect of the present invention, there is provided a position adjusting mechanism for a rangefinder in an automatic focusing system having a light emitting element for projecting a light along an optical axis toward a subject, a photodetector for detecting light reflected from the subject, and a detecting circuit for detecting a position of the reflected light on said photodetector, comprising: said light emitting element having an inclined cam surface inclined relative to both of the optical axis and a base line orthogonal to the optical axis, and at least one guiding member formed integrally on a base surface thereof so as to extend along the direction of the optical axis; a holding body having a reference surface on which at least one guiding member for engaging in said guiding member of said light emitting element and movably holding said light emitting element for movement in a direction parallel to the base line is formed; a first biasing member for biasing said light emitting element in a direction parallel to the optical axis so as to press said light emitting element onto the reference surface of said holding body; a second biasing member for biasing said light emitting element towards said holding body in either a first direction parallel to the base line or a second direction counter to the first direction; and an adjustment member engaged in the cam surface of said light emitting element to reposition said light emitting element in the direction parallel to the base line.

According to another aspect of the present invention, there is provided a rangefinder for an automatic focusing system having a light emitting element for projecting a light along an optical axis toward a subject, a photodetector for detecting the light reflected from the subject, and a detecting circuit for detecting a position of the reflected light on said photodetector, comprising: a package for holding said light emitting element; a reference surface for positioning said package in a direction parallel to the optical axis of said light emitting element, said reference surface being formed on said package; at least one guiding member formed integrally on the reference surface of said package so as to extend parallel to the optical axis as one body on the reference surface of said package; a holding body having a reference surface on which at least one guiding member engageable with said guiding member of said package and movably holding said light emitting element for movement in a direction parallel to the base line is formed; and a moving means for moving said light emitting element in the direction parallel to the base line.

According to a further aspect of the present invention, there is provided an apparatus for repositioning a position of a light emitting element comprising: at least one first guiding member formed integrally with a package for holding said light emitting element; a supporting body for supporting said package; at least one second guiding member engageable with said first guiding member and guiding said package for movement in a predetermined direction, said second guiding member being formed on said supporting body; and a moving means for moving said package in the predetermined direction.

According to a still further aspect of the present invention, there is provided a triangulation rangefinder comprising: a light emitting means for projecting a light toward a subject, said light emitting element being supported by a body; and a photodetector means for detecting light reflected from the subject; wherein said light emitting means comprises a base plate for supporting a light projecting lens, a light emitting element mounted on a reference surface of said base plate, and means for repositioning said light emitting element relative to said base plate; and the reference surface of said base plate and said light emitting element comprise a movable guiding means for moving said light emitting element only in a direction parallel to a base line defined between said light emitting means and said photodetecting means, said base line being orthogonal to the reference surface of said base plate.

BRIEF DESCRIPTION OF THE DRAWINGS

These and other objects and features of the present invention will become clear from the following description taken in conjunction with a preferred embodiment thereof with reference to the accompanying drawings, in which.

DETAILED DESCRIPTION OF THE PREFERRED EMBODIMENT

The preferred embodiment according to the present invention will be described below, referring to the attached drawings.

Figure 5:
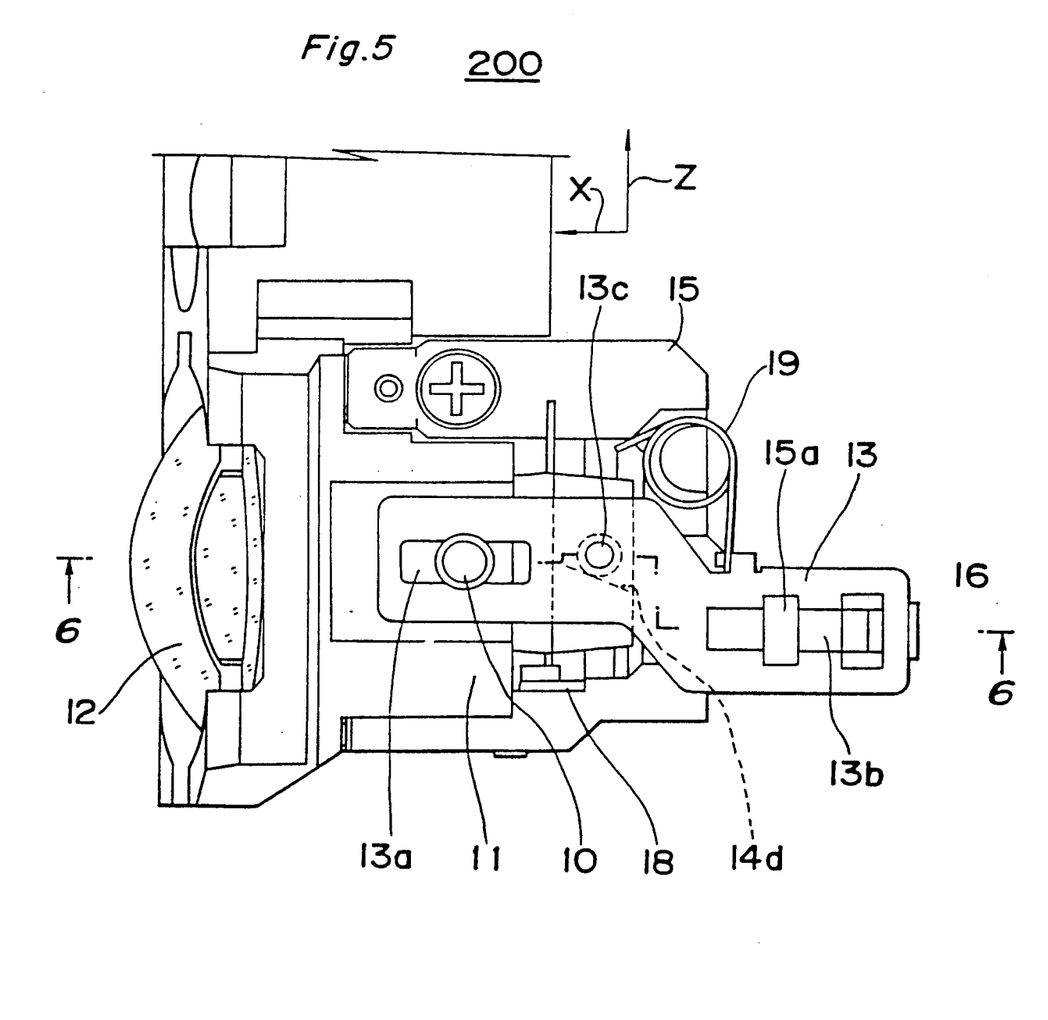
FIG. 5 is a top plan view showing a light emitting device in a rangefinder for a camera according to a preferred embodiment according to the present invention.
Figure 6:
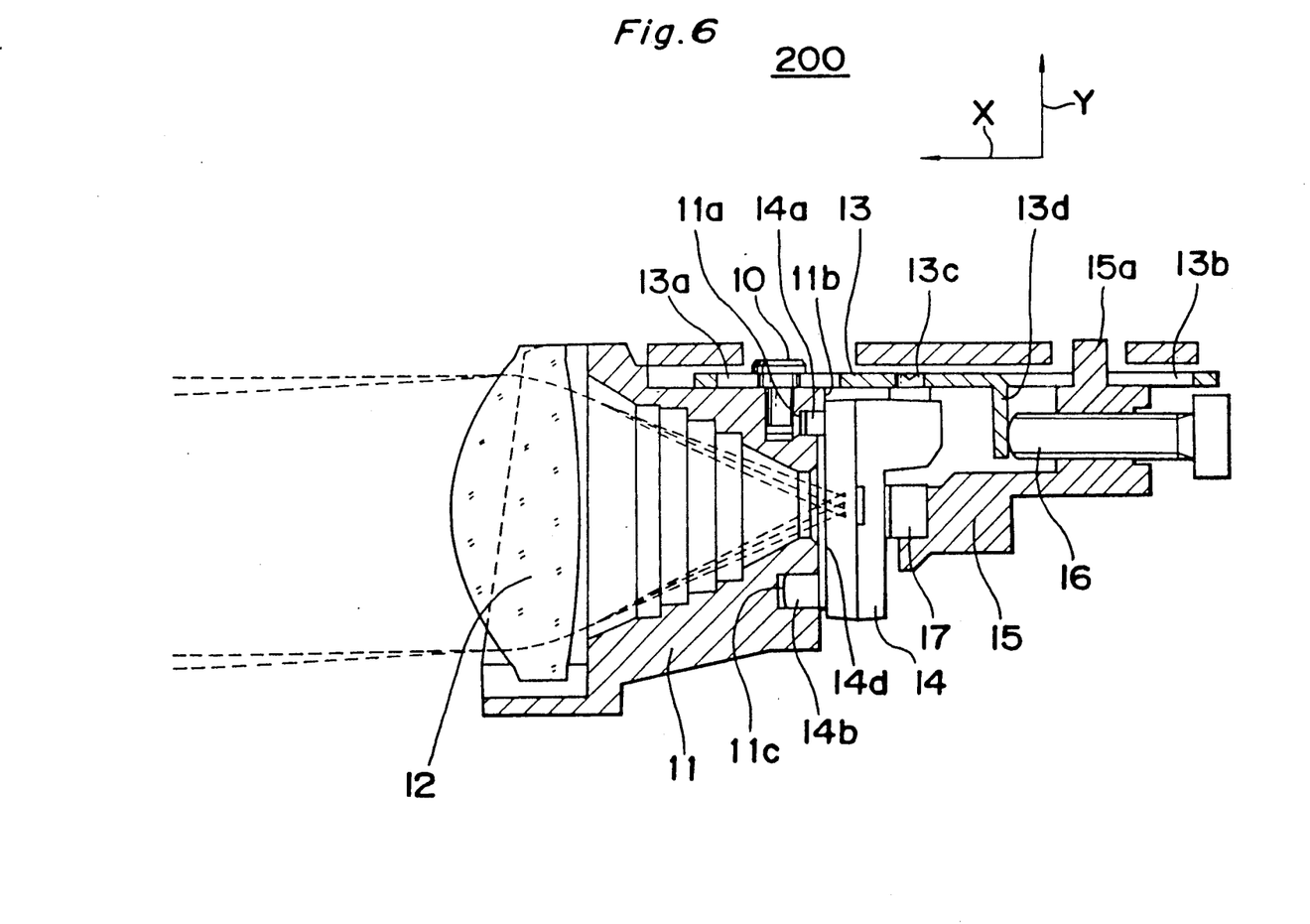
FIG. 6 is a longitudinal cross-sectional view taken along the line I-I' in FIG. 5.
Figure 7:
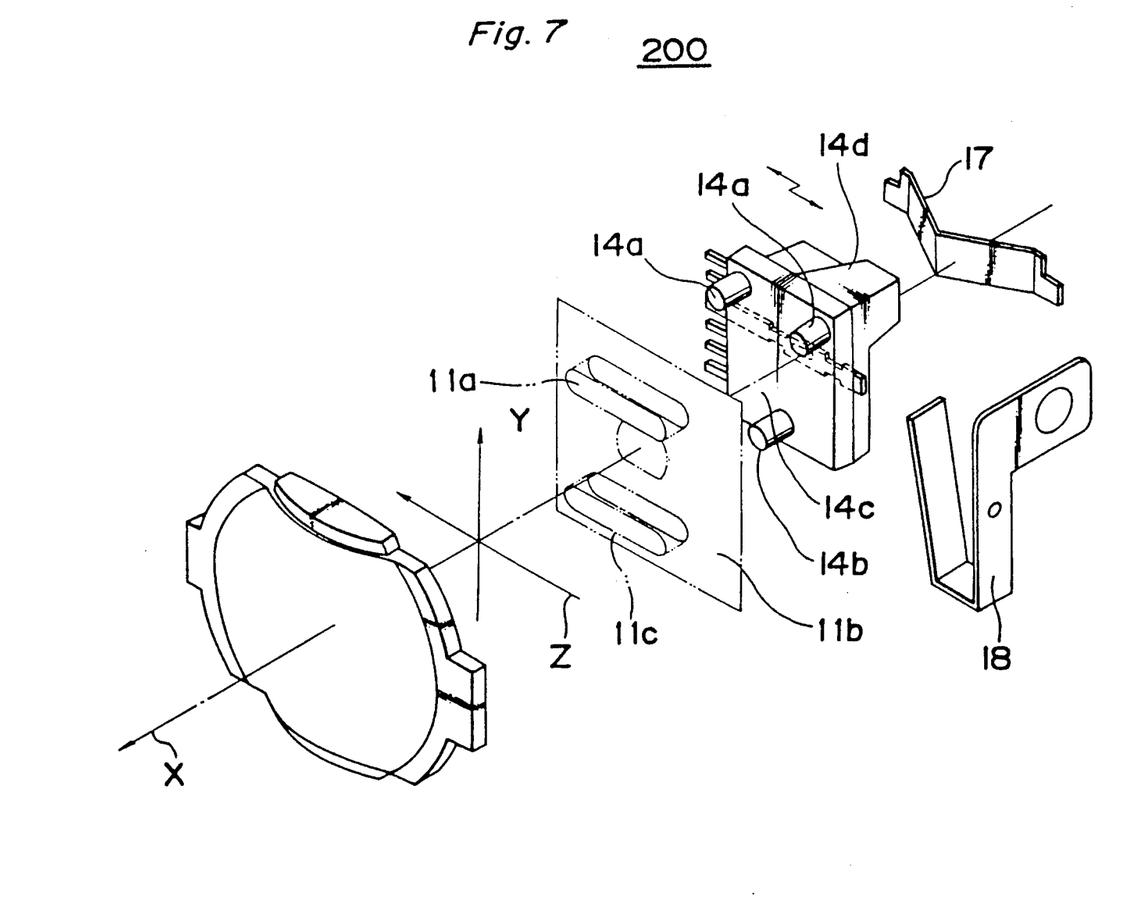
FIG. 7 is an enlarged perspective view showing a main portion of the light emitting device shown in FIG. 5.

Referring to FIGS. 5 to 7, a base plate 11 for supporting a detector system, i.e., both of a light emitting system and a photodetecting system (not shown) is mounted on a camera body (not shown). The light emitting system includes a light projecting lens 12 mounted on a front portion of the base plate 11, and a light emitting module 14 mounted on a rear surface, or mounting base 11b thereof.

As shown in FIG. 7, the light emitting module 14 comprises three cylindrical guiding pins 14a, 14a and 14b formed on a front surface 14c thereof, wherein two guiding pins 14a and 14a are formed on left and right sides of the upper portion of the front surface 14c, respectively, and the pin 14b is formed at the lower center portion thereof.

On the other hand, on the surface 11b of the base plate 11, there are formed a guiding groove 11a for engaging in a pair of upper guiding pins 14a and 14a of the light emitting module 14, and a guiding groove 11c for accommodating the lower guiding pins 14b thereof, so that the light emitting module 14 can be moved only in the Z- axis direction, i.e., the direction of the base line BL, along the guiding grooves 11a and 11c.

A holding frame 15 for holding two plate springs 17 and 18 is fixed at the rear portion of the base plate 11. The plate spring 17 is in contact with the rear surface of the light emitting module 14 as shown in FIG. 6, and then, the surface 14c of the light emitting module 14 is pressed elastically onto the surface 11b of the base plate 11 by the plate spring 17. Another plate spring 18 is in contact with one side surface of the light emitting module 14, and then, the light emitting module 14 is normally biased in the Z- axis direction toward the photodetecting system (not shown).

An adjustment plate 13 is mounted for sliding motion in the X- axis direction on the top surface of the base plate 11. A guiding groove 13a is formed at the front portion of the adjustment plate 13, and a guiding pin 10 with a head which is fixed on the top surface of the base plate 11 is inserted into the guiding groove 13a.

Furthermore, at the rear portion of the adjustment plate 13, the plate 13 has a rise piece 13d bent so as to extend at right angle to the top surface thereof, and a guiding groove 13b. A guiding projection 15a formed on the holding frame 15 is passed through the guiding groove 13b. The adjustment plate 13 is guided in the X- axis direction by the guiding pin 10 and the guiding projection 15a.

The adjustment plate 13 is normally biased in a direction away from the lens 12 along the X- axis direction by a spring 19 disposed between the adjustment plate 13 and the holding frame 15. On the other hand, an adjustment screw 16 is screwed into a predetermined portion of the holding frame 15 so as to extend in the X- axis direction, and an end portion of the adjustment screw 16 is held in contact with the rear surface of the bent piece 13d of the adjustment plate 13. That is, when the adjustment screw 16 is rotated, the adjustment plate 13 is moved forward along the X- axis direction, against the biasing force of the spring 19.

The adjustment plate 13 comprises an adjustment pin 13c fixed at a predetermined portion thereof. The adjustment pin 13c is moved with a cam surface 14b of the light emitting module 14. That is, when the adjustment plate 13 is moved forward along the X- axis direction, the adjustment pin 13c acts on the cam surface 14d so as to move the light emitting module 14 in a direction downward as viewed in FIG. 5 along the Z- axis direction. On the other hand, when the adjustment plate 13 is moved backward along the X- axis direction, the light emitting module 14 is moved in a direction upward as viewed in FIG. 5 along the Z- axis direction by the biasing force of the plate spring 18.

The amount Δz of movement of the light emitting module 14 in the direction of the base line BL (the base length), i.e., along the Z- axis direction is expressed by the following equation (3):

$$\Delta z = P \cdot \frac{\theta}{360} \tan \phi \quad (3)$$

wherein P is the thread pitch of the adjustment screw 16,

θ is the rotation angle of rotation of the adjustment screw 16, and

φ is the inclination angle of inclination of the cam surface 14d to the X- axis direction.

For example, under the condition of P=0.35 mm, and φ=23°, the movement amount Δz becomes 0.41 μm/deg, resulting in that the fine adjustment mechanism has a sensitivity approximately ten times that of the conventional fine adjustment mechanism.

In the light emitting device 200 constructed as described above, when respective outer profiles of the base plate 11 and the light emitting module 14 are highly precisely formed by a plastic molding method, it is possible to adjust the light emitting module 14 in the X- and Y- axis directions against the base plate 11 highly precisely, and it is unnecessary to adjust the position of the light emitting module 14 in the X- and Y- axis directions. Furthermore, the position of the light emitting module 14 can be adjusted in the direction of the base line BL (the base length), i.e., in the Z- axis direction extremely precisely.

Figure 8A:
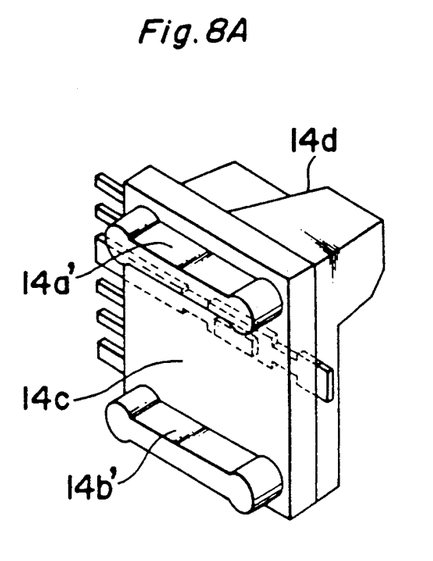
FIGS. 8A, 8B and 8C are perspective views showing modifications of the light emitting device shown in FIGS. 5 to 7.
Figure 8B:
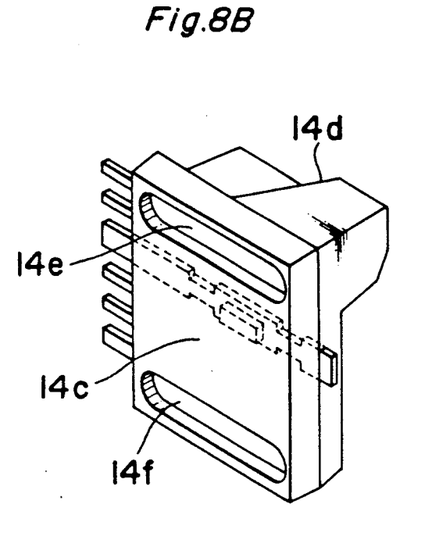
Figure 8C:
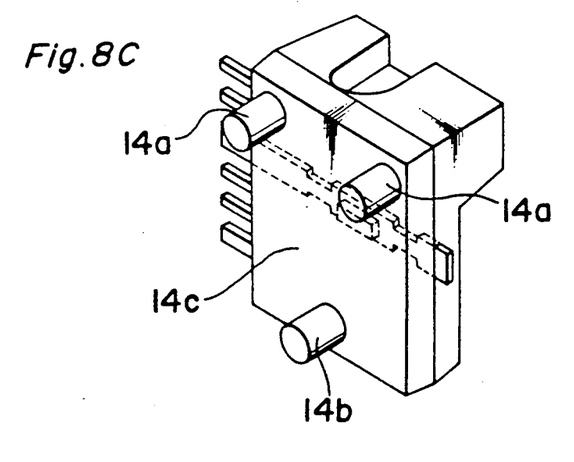

FIGS. 8A to 8C shows respective modifications of the light emitting module 14, respectively.

In FIG. 8A, on the front surface 14c, there are formed a projection 14a' of such a shape that a pair of guiding pins 14a and 14a shown in FIG. 7 is connected with each other, and a projection 14b' having a similar shape as that of the projection 14a' corresponding to the guiding pin 14b shown in FIG. 7. When the light emitting module 14 comprises the projections 14a' and 14b' having the above shapes, guiding grooves for respectively engaging in the projections 14a' and 14b' are formed on the surface 11b of the base plate 11.

In FIG. 8B, guiding grooves 14e and 14f are formed on the upper and lower portions of the front surface 14c of the light emitting module 14, respectively. In this case, projections or strips for respectively engaging in the guiding grooves 14e and 14f are formed on the surface 11b of the base plate 11.

FIG. 8C shows the light emitting module 14 having no element, corresponding to the cam surface 14d of FIGS. 8A and 8B formed thereon. In this case, the position of the light emitting module 14 in the Z- axis direction can be adjusted using an appropriate tool.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A position adjusting mechanism for a rangefinder in an automatic focusing system having a light emitting element for projecting a light along an optical axis toward a subject, a photodetector for detecting light reflected from the subject, and a detecting circuit for detecting a position of the reflected light on said photodetector, comprising:

said light emitting element having an inclined cam surface inclined relative to both of the optical axis and a base line orthogonal to the optical axis, and at least one guiding member formed integrally on a base surface thereof so as to extend along the direction of the optical axis;

a holding body having a reference surface on which at least one guiding member is formed for engaging said guiding member of said light emitting element and for movably holding said light emitting element for movement in a direction parallel to the base line;

a first biasing member for biasing said light emitting element in a direction parallel to the optical axis so as to press said light emitting element onto the reference surface of said holding body;

a second biasing member for biasing said light emitting element towards said holding body in either a first direction parallel to the base line or a second direction counter to the first direction; and an adjustment member for engaging the cam surface of said light emitting element to reposition said light emitting element in the direction parallel to the base line.

2. The position adjusting mechanism as claimed in claim 1, wherein said guiding member of said light emitting element is a guiding projection, and said guiding member of said holding body is a guiding groove.

3. The position adjusting mechanism as claimed in claim 1, wherein said guiding member of said light emitting element is a guiding groove, and said guiding member of said holding body is a guiding projection.

4. The position adjusting mechanism as claimed in claim 2, further comprising:
a third biasing member in a direction parallel to the optical axis; and
a screw member for moving said adjustment member against a biasing force of said third biasing member in a direction parallel to the optical axis.

5. The position adjusting mechanism as claimed in claim 1, further comprising:
a third biasing member for biasing said said adjustment member in a first direction parallel to the direction of the optical axis; and
a screw member for moving said adjustment member against the biasing force of said third biasing member in a second direction parallel to the optical axis and counter to the first direction of the adjustment member as biased by said third biasing member.

6. A rangefinder for an automatic focusing system having a light emitting element for projecting a light along an optical axis toward a subject, a photodetector for detecting the light reflected from the subject, and a detecting circuit for detecting a position of the reflected light on said photodetector, comprising:

a package for holding said light emitting element;
a reference surface for positioning said package in a direction parallel to the optical axis of said light emitting element while allowing said package and said light emitting element held thereby to move perpendicular to the optical axis, said reference surface being formed on said package;

at least one guiding member formed integrally on the reference surface of said package so as to extend parallel to the optical axis as one body on the reference surface of said package;

a holding body having a reference surface on which at least one guiding member is formed which is engageable with said guiding member of said package for movably holding said light emitting element for movement in a direction parallel to a base line while preventing said light emitting element from moving in the other directions; and a moving means for moving said light emitting element in the direction parallel to the base line.

7. The rangefinder as claimed in claim 6, wherein said guiding member of said package is a guiding projection, and said guiding member of said holding body is a guiding groove.

8. The rangefinder as claimed in claim 6, wherein said guiding member of said package is a guiding groove, and said guiding member of said holding body is a guiding projection.

9. An apparatus for adjusting a position of a light emitting element comprising:

at least one first guiding member provided fixedly with a package for holding said light emitting element;

a supporting body for supporting said package;
at least one second guiding member engageable with said first guiding member for guiding said package and said light emitting element held thereby for movement in a direction parallel to a base line while preventing said package from moving in the other directions, said second guiding member being formed on said supporting body; and a moving means for moving said package in the direction parallel to the base line.

10. The apparatus as claimed in claim 9, wherein said first guiding member is a guiding projection, and said second guiding member is a guiding groove.

11. The apparatus as claimed in claim 9, wherein said first guiding member is a guiding groove, and said second guiding member is a guiding projection.

12. The apparatus as claimed in claim 9, wherein the direction parallel to the base line is a direction orthogonal to the optical axis of said light emitting element.

13. The apparatus as claimed in claim 9, wherein said supporting body has a first guiding surface, said second guiding member being formed on said first guiding surface; and said package has a second guiding surface engageable with said first guiding surface, second guiding member being formed on said second guiding surface.

14. The apparatus as claimed in claim 13, wherein said first and second guiding surfaces are formed in a direction orthogonal to the optical axis of said light emitting element.

15. A triangulation rangefinder comprising:
a light emitting means for projecting a light toward a subject, said light emitting means being supported by a body; and
a photodetector means for detecting light reflected from the subject;
wherein said light emitting means comprises a base plate for supporting a light projecting lens, a light emitting element mounted on a reference surface of said base plate, and means for repositioning said light emitting element relative to said base plate; and the reference surface of said base plate and said light emitting element comprises a movable guiding means for moving said light emitting element only in a direction parallel to a base line defined between said light emitting means and said photodetector means, said base line being parallel to the reference surface of said base plate.

16. The rangefinder as claimed in claim 15, wherein said movable guiding means comprises a guiding projection formed as one body with said light emitting element and projecting along the optical axis of said light emitting element, and a guiding groove formed on said base plate and engaging said guiding projection.

17. The rangefinder as claimed in claim 15, wherein said movable guiding means comprises a guiding projection formed as one body with said base plate and projecting along the optical axis of said light emitting element, and a guiding groove formed on said light emitting element and engaging in said guiding projection.

18. The rangefinder as claimed in claim 16, wherein said light emitting element has a package, and said guiding projection is formed as one body with said package.

19. The rangefinder as claimed in claim 16, wherein said light emitting element has a package, and said guiding groove is formed as one body with said package.

20. An apparatus for adjusting a position of a photoelectric converting element comprising:
at least one first guiding member provided fixedly with a package for holding said converting element;
a supporting body for supporting said package;
at least one second guiding member engageable with said first guiding member and guiding said package and said converting element held thereby for movement in a direction parallel to a base line while preventing said package and said converting element held thereby from moving in the other directions, said second guiding member being formed on said supporting body; and
a moving means for moving said package in said direction.

21. The apparatus as claimed in claim 20, wherein said first guiding member is a guiding projection, and said second guiding member is a guiding groove.

22. The apparatus as claimed in claim 20, wherein said first guiding member is a guiding groove, and said second guiding member is a guiding projection.

23. The apparatus as claimed in claim 20, wherein said direction parallel to said base line is a direction orthogonal to the optical axis of said converting element.

24. The apparatus as claimed in claim 20, wherein said supporting body has a first guiding surface, said second guiding member being formed on said first guiding surface; and
said package has a second guiding surface engageable with said first guiding surface, said second guiding member being formed on said second guiding surface.

25. The apparatus as claimed in claim 24, wherein said first and second guiding surfaces are formed in a direction orthogonal to the optical axis of said converting element.

26. The apparatus as claimed in claim 20, wherein said photo-electric converting element is a light emitting element.

* * * * *

UNITED STATES PATENT AND TRADEMARK OFFICE
CERTIFICATE OF CORRECTION

PATENT NO. : 5,099,112

DATED : March 24, 1992

INVENTOR(S) : Masatoshi Kamitani, et al.

Page 1 of 2

It is certified that error appears in the above-identified patent and that said Letters Patent is hereby corrected as shown below:

In col. 5, line 7, change "which" to --while--.

In col. 6, line 50, change "I-I'" to --6-6--.

In col. 7, line 14, change "pins" to --pin--.

In col. 9, line 39 (claim 4, line 2), change "2" to --1--.

In col. 9, line 40 (claim 4, line 3), after "biasing" insert --member for biasing said adjustment--.

In col. 9, line 47 (claim 5, line 3), delete "said" (second occurrence).

In col. 10, line 51 (claim 13, line 6), before "second" insert --said--.

UNITED STATES PATENT AND TRADEMARK OFFICE
CERTIFICATE OF CORRECTION

PATENT NO. : 5,099,112
DATED : March 24, 1992
INVENTOR(S) : Masatoshi Kamitani, et al.

It is certified that error appears in the above-indentified patent and that said Letters Patent is hereby corrected as shown below:

In col. 10, line 51 (claim 13, line 6), before "second" insert --said--.

Signed and Sealed this

Twenty-ninth Day of June, 1993

MICHAEL K. KIRK

Attest:

Attesting Officer

Acting Commissioner of Patents and Trademarks